(12) United States Patent
Sawamura

(10) Patent No.: US 12,474,077 B2
(45) Date of Patent: Nov. 18, 2025

(54) SHUT-OFF VALVE CONTROL DEVICE FOR REFRIGERATION CYCLE, AND AIR CONDITIONER

(71) Applicant: TOSHIBA CARRIER CORPORATION, Kanagawa (JP)

(72) Inventor: Mitsuru Sawamura, Shizuoka (JP)

(73) Assignee: CARRIER JAPAN CORPORATION, Tokyo (JP)

( * ) Notice: Subject to any disclaimer, the term of this patent is extended or adjusted under 35 U.S.C. 154(b) by 2 days.

(21) Appl. No.: 18/275,970

(22) PCT Filed: Jun. 17, 2021

(86) PCT No.: PCT/JP2021/023068
§ 371 (c)(1),
(2) Date: Aug. 4, 2023

(87) PCT Pub. No.: WO2022/264368
PCT Pub. Date: Dec. 22, 2022

(65) Prior Publication Data
US 2024/0117989 A1    Apr. 11, 2024

(51) Int. Cl.
*F24F 11/88* (2018.01)
*F24F 11/36* (2018.01)
*F24F 11/84* (2018.01)

(52) U.S. Cl.
CPC .............. *F24F 11/88* (2018.01); *F24F 11/36* (2018.01); *F24F 11/84* (2018.01)

(58) Field of Classification Search
CPC ................ F25B 49/005; F25B 2500/06; F25B 2500/222; F25B 2600/2521; F25B 2700/15
See application file for complete search history.

(56) References Cited

U.S. PATENT DOCUMENTS

2010/0280669 A1* 11/2010 Wycoff ................. F25B 49/005
700/282
2020/0130471 A1    4/2020 Leasure
(Continued)

FOREIGN PATENT DOCUMENTS

EP        2491639 B1    8/2012
JP        H0439588 A    2/1992
(Continued)

OTHER PUBLICATIONS

International Search Report dated Aug. 3, 2021, for International Patent Application No. PCT/JP2021/023068.
(Continued)

*Primary Examiner* — Nelson J Nieves
(74) *Attorney, Agent, or Firm* — KARCESKI IP LAW, PLLC

(57) ABSTRACT

A shut-off valve control device for a refrigeration cycle includes: a leakage detection unit configured to detect leakage of a refrigerant in a refrigeration cycle including an indoor unit and an outdoor unit; a shut-off valve which is disposed in a pipe that connects the indoor unit with the outdoor unit and which can be opened and closed by supplying electric power; a power failure detection unit configured to detect a power failure; a backup power supply configured to be capable of alternatively supplying power; and a shut-off valve control circuit configured to control the shut-off valve to be closed when the leakage detection unit detects leakage of the refrigerant. The shut-off valve control circuit causes the backup power supply to be started when the power failure detection unit detects a power failure and closes the shut-off valve when the detected power failure exceeds a certain time period.

2 Claims, 11 Drawing Sheets

(56) References Cited

U.S. PATENT DOCUMENTS

2021/0325068 A1* 10/2021 Wakisaka ................ F25B 13/00
2022/0390160 A1* 12/2022 Fujimoto ................ F25B 49/02

FOREIGN PATENT DOCUMENTS

| JP | 05004220 U | 1/1993 |
| JP | H07280319 A | 10/1995 |
| JP | 2005121333 A | 5/2005 |
| JP | 2016031167 A | 3/2016 |
| JP | 2020134005 A | 8/2020 |
| WO | 2018078729 A1 | 5/2018 |
| WO | 2020110425 A1 | 6/2020 |
| WO | 2021054199 A1 | 3/2021 |

OTHER PUBLICATIONS

Extended European Search Report dated Mar. 19, 2025, for European Patent Application No. 21946045.8.

* cited by examiner

SHUT-OFF VALVE CONTROL DEVICE FOR REFRIGERATION CYCLE, AND AIR CONDITIONER

CROSS-REFERENCE TO RELATED APPLICATION(S)

This is a National Stage Entry into the United States Patent and Trademark Office from International Patent Application No. PCT/JP2021/023068, filed on Jun. 17, 2021, the entire contents of which are incorporated herein by reference.

FIELD OF THE INVENTION

An embodiment of the present invention relates to a device which, upon detection of leakage of a refrigerant that is used in a refrigeration cycle of an air conditioner or the like to the indoors, closes a shut-off valve provided inside a pipe that is connected to an indoor unit installed indoors.

BACKGROUND OF THE INVENTION

For example, for safety purposes, IEC 60335 requires a refrigeration cycle device which uses an A2L refrigerant such as R32 to be equipped with an instrument for detecting leakage of the refrigerant and a shut-off valve for stopping the leakage of the refrigerant or a ventilation fan and requires the refrigeration cycle device to close the shut-off valve even when leakage of the refrigerant occurs during a power failure in order to minimize an amount of the leakage. In such a safety device, since leakage of a refrigerant cannot be detected during a power failure, for example, WO 2018/078729 and Japanese Patent Laid-Open No. 2020-134005 describe providing a refrigeration cycle device with a standby power supply and closing a shut-off valve with the standby power supply during a power failure.

SUMMARY OF THE INVENTION

However, the aforementioned WO 2018/078729 and Japanese Patent Laid-Open No. 2020-134005 only describes providing the standby power supply and does not provide a specific description on what kind of procedures are followed in order to completely close an on and off valve during a power failure. Since a power failure of a device in which each constituent unit is individually connected to a power supply such as a refrigeration cycle device may include various occurrence modes and occurrence locations, there may be cases where, even when an occurrence of a power failure is detected, there is no need to perform control for immediately closing the on and off valve. In addition, a standby power supply such as a battery is not capable of inexhaustibly supplying electric power and, normally, the standby power supply must be kept in a state where consumption of electric power is minimized in order to close a shut-off valve when leakage of a refrigerant actually occurs.

In consideration thereof, a shut-off valve control device for a refrigeration cycle and an air conditioner which are capable of performing control to suitably close an on and off valve in response to circumstances are provided.

A shut-off valve control device for a refrigeration cycle according to an embodiment includes:
 a leakage detection unit configured to detect leakage of a refrigerant that is used in a refrigeration cycle including an indoor unit and an outdoor unit;
 a shut-off valve which is disposed in a pipe that connects the indoor unit and the outdoor unit with each other and which can be opened and closed by supplying electric power;
 a power failure detection unit configured to detect a power failure in an AC power supply configured to supply electric power to the shut-off valve;
 a backup power supply configured to be capable of alternatively supplying power upon an occurrence of a power failure; and
 a shut-off valve control circuit configured to control the shut-off valve to be closed when the leakage detection unit detects leakage of the refrigerant, wherein
 the shut-off valve control circuit is configured to control the shut-off valve to be closed when the power failure detection unit continues to detect a power failure for a predetermined time period.

In addition, an air conditioner according to an embodiment includes:
 an indoor unit installed indoors;
 an outdoor unit;
 a leakage detection unit which is installed indoors where the indoor unit is installed and which is configured to detect leakage of a refrigerant that is used in a refrigeration cycle made up of the indoor unit and the outdoor unit; and
 a shut-off valve device which is provided midway along a pipe that connects the indoor unit and the outdoor unit with each other and which is equipped with a shut-off valve configured to open or shut off a flow of the refrigerant between the indoor unit and the outdoor unit by electric power, wherein
 the shut-off valve device includes: a power failure detection unit configured to detect a power failure in an AC power supply configured to supply electric power to the shut-off valve;
 a backup power supply capable of alternatively supplying electric power upon an occurrence of a power failure; and
 a shut-off valve control circuit configured to control the shut-off valve to be closed when the power failure detection unit detects leakage of the refrigerant and to control the shut-off valve to be closed when the power failure detection unit continues to detect a power failure for a predetermined time period.

DESCRIPTION OF EMBODIMENT(S) OF THE INVENTION

First Embodiment

Figure 1:
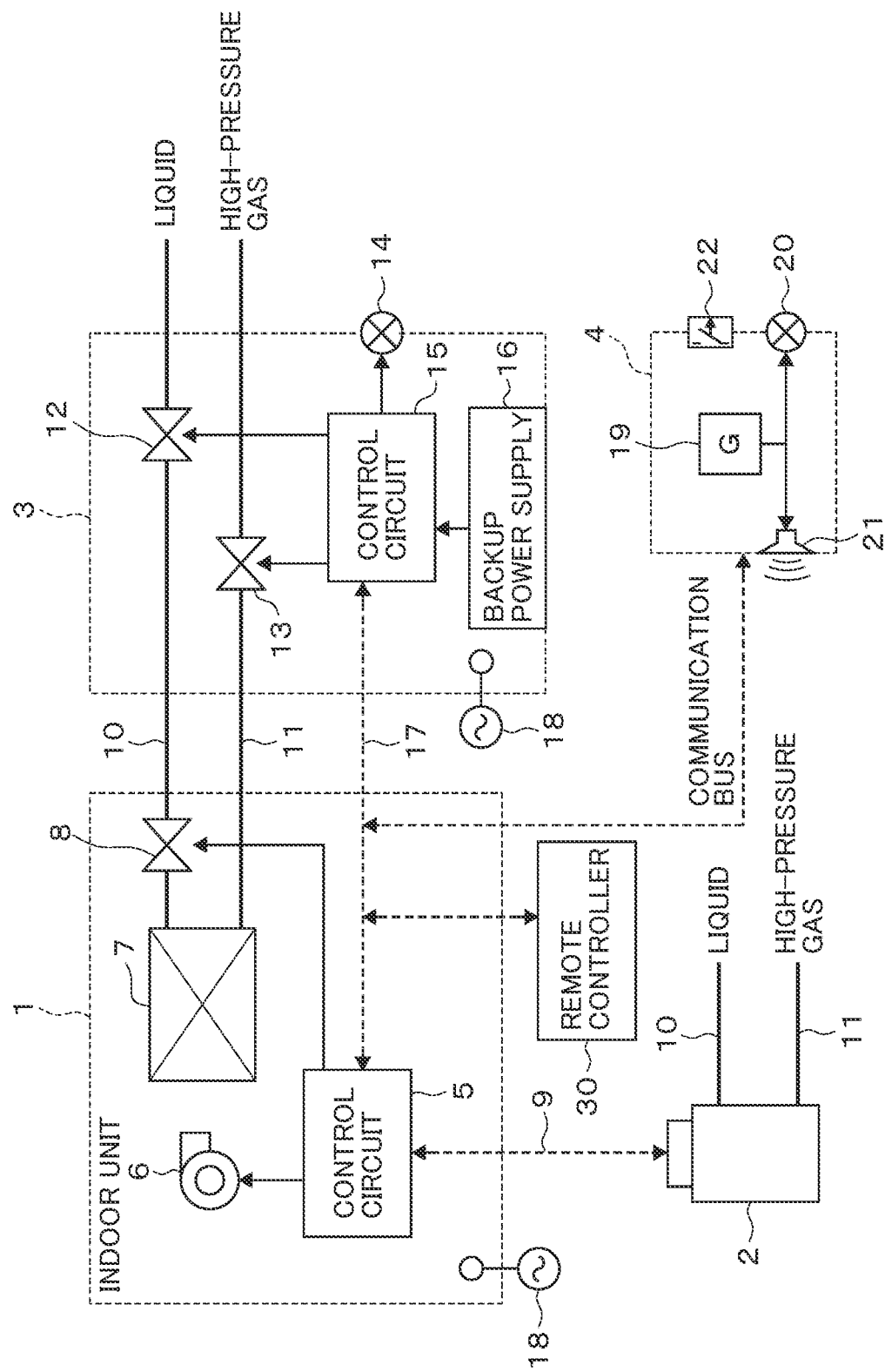
FIG. 1 is a diagram showing a configuration of a refrigeration cycle system according to a first embodiment.

As shown in FIG. 1, a refrigeration cycle device according to the present embodiment is, for example, an air conditioner made up of an indoor unit 1 to be installed indoors, an outdoor unit 2 to be installed outdoors, and refrigerant pipes 10 and 11 which connect the indoor unit 1 and the outdoor unit 2 to each other. The air conditioner is further equipped with a shut-off valve device 3 and a refrigerant detection alarm 4 which are interposed midway along the refrigerant pipes 10 and 11. The indoor unit 1 has an indoor control circuit 5, a fan 6, a heat exchanger 7, and an on and off valve 8, and the indoor control circuit 5 controls the on and off valve 8 which switches between the fan 6 that sends air to the indoor heat exchanger and circulation of a refrigerant. In addition, the indoor control circuit 5 communicates with an outdoor control circuit (not illustrated) of the outdoor unit 2 located outdoors via a communication line 9. Note that while the shut-off valve device 3 can also be built into the indoor unit 1, the size of the indoor unit 1 increases when doing so. Therefore, the shut-off valve device 3 is desirably installed in the ceiling or under the floor in the vicinity of the indoor unit 1.

The heat exchanger 7 of the indoor unit 1 is connected to the outdoor unit 2 via the liquid-side pipe 10 and the gas-side pipe 11, and the refrigeration cycle is formed as the refrigerant circulates through these pipes. The on and off valve 8 of the indoor unit 1 is arranged on a side of the pipe 10 to be a liquid side. In addition, the shut-off valve device 3 is interposed in the pipes 10 and 11 between the indoor unit 1 and the outdoor unit 2. A refrigerant liquid such as R32 is sent out to the outdoor unit 2 from the indoor unit 1 by the pipe 10 and a high-pressure gasified form of the refrigerant liquid is returned to the indoor unit 1 from the outdoor unit 2 by the pipe 11. In a case where the indoor unit 1 and the outdoor unit 2 are applied to a so-called multi-type, in which a plurality of the indoor units 1 are connected in parallel to a refrigerant pipe of one outdoor unit 2, which is also a cooling and heating simultaneous multi-air conditioner that enables a combination of heating and cooling of each indoor unit 1 to be freely selected, since each indoor unit 1 and the outdoor unit 2 are to be connected by three pipes, a shut-off valve must also be provided midway along the third pipe in addition to shut-off valves 12 and 13.

The shut-off valve device 3 is equipped with the shut-off valves 12 and 13 that are respectively interposed in the pipes 10 and 11, an open and closed display lamp 14, a shut-off valve control circuit 15 which controls the shut-off valves 12 and 13 and the open and closed display lamp 14, and a backup power supply 16. The shut-off valve control circuit 15 is connected to the indoor control circuit 5 of the indoor unit 1 via a communication bus 17 and communication is performed between the two control circuits. The backup power supply 16 is constituted of, for example, a secondary battery such as a lithium battery or a supercapacitor. The backup power supply 16 is normally charged by an AC power supply 18 to which the shut-off valve device 3 is connected and is used to operate the shut-off valve device 3 when a power failure occurs in the AC power supply 18. Lighted and extinguished states of the open and closed display lamp 14 are controlled in accordance with open and closed states of the shut-off valves 12 and 13. The shut-off valves 12 and 13 are electronically controlled valves or so-called pulse motor valves (PMVs) in which open and closed states of the valves are controlled by motor drive. Note that a similar electronically controlled valve can be used as the on and off valve 8.

The refrigerant detection alarm 4 which corresponds to the leakage detection unit is equipped with a gas sensor 19 for detecting the refrigerant at a predetermined concentration in the air, an alarm lamp 20, an alarm buzzer 21, a detected state release switch 22, and a control circuit (not illustrated) for communicating with the indoor unit 1. When the refrigerant in a gasified state leaks from the pipe 10 or 11, the gas sensor 19 outputs a leakage detection signal upon detecting the gas. Accordingly, the alarm lamp 20 is lighted and the alarm buzzer 21 is sound. In addition, the refrigerant detection alarm 4 is also connected to the communication bus 17 and the control circuit outputs the leakage detection signal to the indoor control circuit 5 of the indoor unit 1. Note that the communication bus 17 is also equipped with a power supply line and the refrigerant detection alarm 4 receives supply of power for operation from the indoor unit 1 via the communication bus 17. Generally, the refrigerant detection alarm 4 is installed in an air-conditioned room where the indoor unit 1 is installed. Note that the refrigerant detection alarm 4 may be built into the indoor unit 1.

Figure 2:
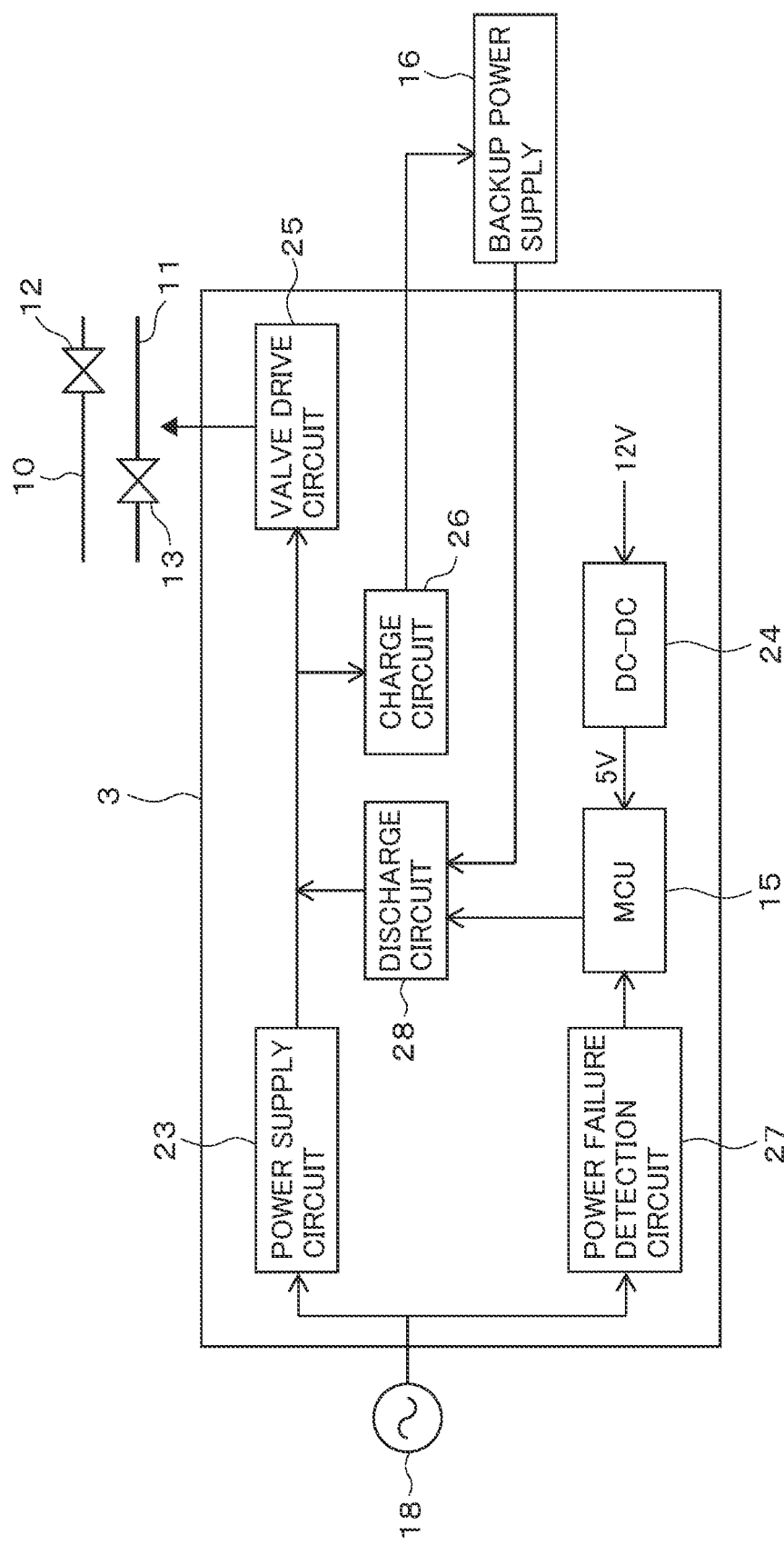
FIG. 2 is a functional block diagram showing a detailed configuration of a shut-off valve control device.

FIG. 2 is a functional block diagram showing a detailed configuration of the shut-off valve device 3. The shut-off valve control circuit 15 which corresponds to the control unit is constituted of, for example, an MCU (Micro Control Unit). A power supply circuit 23 is an AC-DC converter which generates, for example, a 12 V DC power supply from the input AC power supply 18 and supplies the generated DC power to a DC-DC converter 24, a valve drive circuit 25, a charge circuit 26, and the like. The DC-DC converter 24 supplies the shut-off valve control circuit 15 with a 5 V DC power supply generated by stepping-down the 12 V DC power supply.

The valve drive circuit 25 outputs a drive signal for driving the shut-off valves 12 and 13 to be opened and closed in accordance with a control signal from the shut-off valve control circuit 15. The charge circuit 26 steps-down the 12 V DC power supply to an appropriate voltage and charges the backup power supply 16. A power failure detection circuit 27 which corresponds to the power failure detection unit has, for example, a photocoupler, and an input side of the power failure detection circuit 27 is connected to the AC power supply 18 while an output side thereof is connected to the shut-off valve control circuit 15. When the AC power supply 18 continues to supply power, an output signal from the power failure detection circuit 27 is continuously input to the shut-off valve control circuit 15 in accordance with the continuous supply of power. When a power failure occurs in the AC power supply 18, since input of the output signal described above to the shut-off valve control circuit 15 is stopped, the stoppage constitutes a power failure detection signal which is input to the shut-off valve control circuit 15 as an interrupt signal. In this case, the power supply 18 of the indoor unit 1 and the power supply 18 of the shut-off valve device 3 may be a same commercial AC power supply or different power supplies. When different power supplies are respectively installed, a situation where a power failure of the indoor unit 1 and a power failure of the shut-off valve device 3 occur separately may also be expected.

Power supply from the backup power supply 16 to a DC 12 V line is performed via a discharge circuit 28 and the discharge circuit 28 is controlled by the shut-off valve control circuit 15. In other words, when electric power is supplied from the power supply 18 to the shut-off valve device 3, the backup power supply 16 is charged by the discharge circuit 28, but when supply of electric power to the shut-off valve device 3 stops due to a power failure of the power supply 18 or the like, power feed from the backup power supply 16 to the shut-off valve control circuit 15 is started. Note that illustration of the open and closed display lamp 14 is omitted. In addition, a remote controller 30 is connected to the communication bus 17.

Next, operations of the present embodiment will be described with reference to FIGS. 3 to 10. FIGS. 3 to 7 show a control sequence among the shut-off valve device 3, the indoor unit 1, and the refrigerant detection alarm 4.

Steady State Operation

Figure 3:
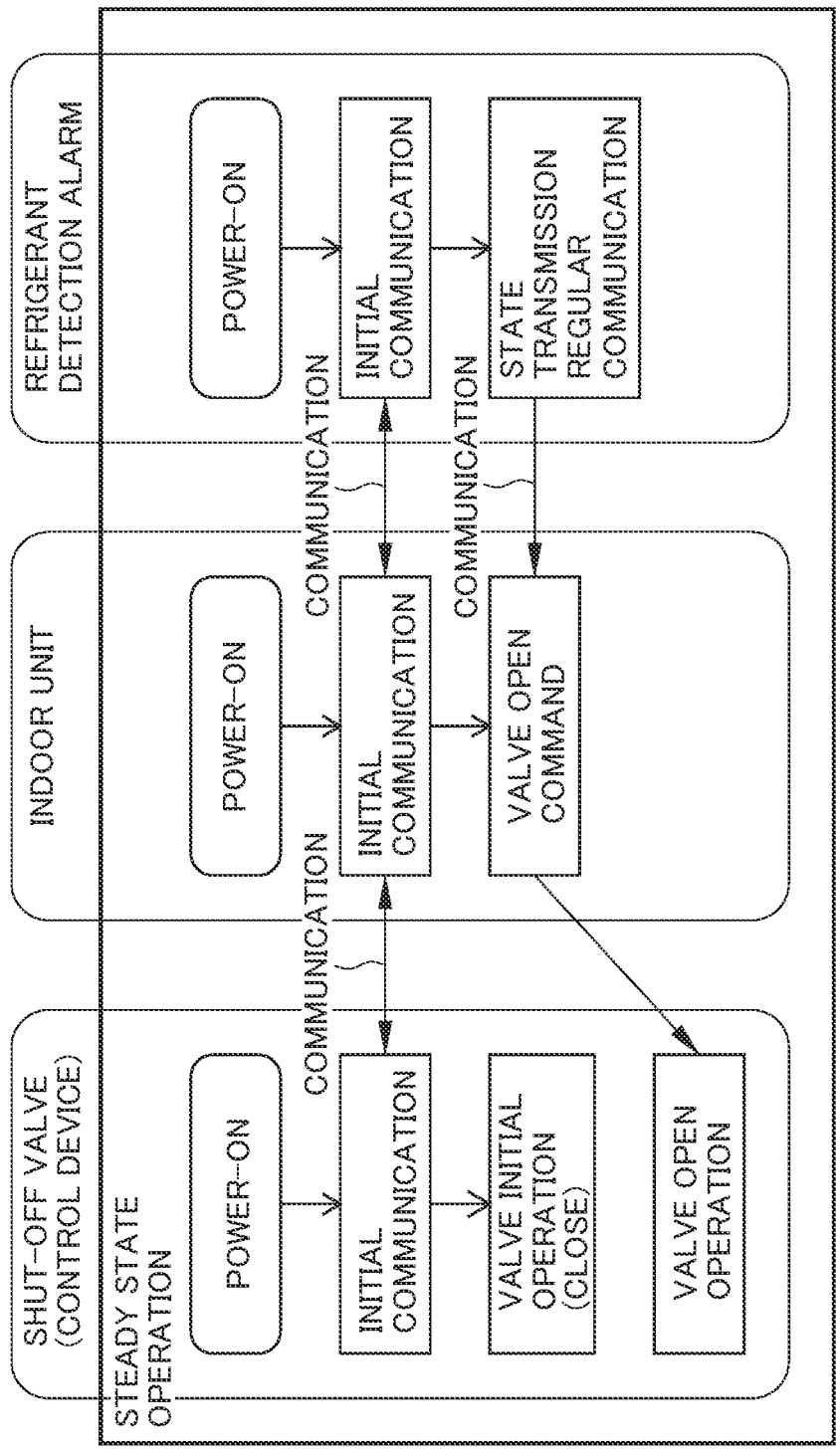
FIG. 3 is a diagram showing a steady state operation in a control sequence among the shut-off valve control device, an indoor unit, and a refrigerant detection alarm.

In a steady state operation shown in FIG. 3, when the AC power supply 18 is fed to each device and the device is activated, an "initial communication" is performed via the communication bus 17 between the indoor unit 1 and the shut-off valve device 3 and between the indoor unit 1 and the refrigerant detection alarm 4. Subsequently, while the shut-off valve device 3 closes the shut-off valves 12 and 13 as a "valve initial operation", when the shut-off valve device 3 receives a "valve open command" from the indoor unit 1, the shut-off valve device 3 opens the shut-off valves 12 and 13. The refrigerant detection alarm 4 performs a "state transmission regular communication" for notifying the indoor unit 1 of a presence or absence of detection of a refrigerant leakage.

Refrigerant Leakage Operation

Figure 4:
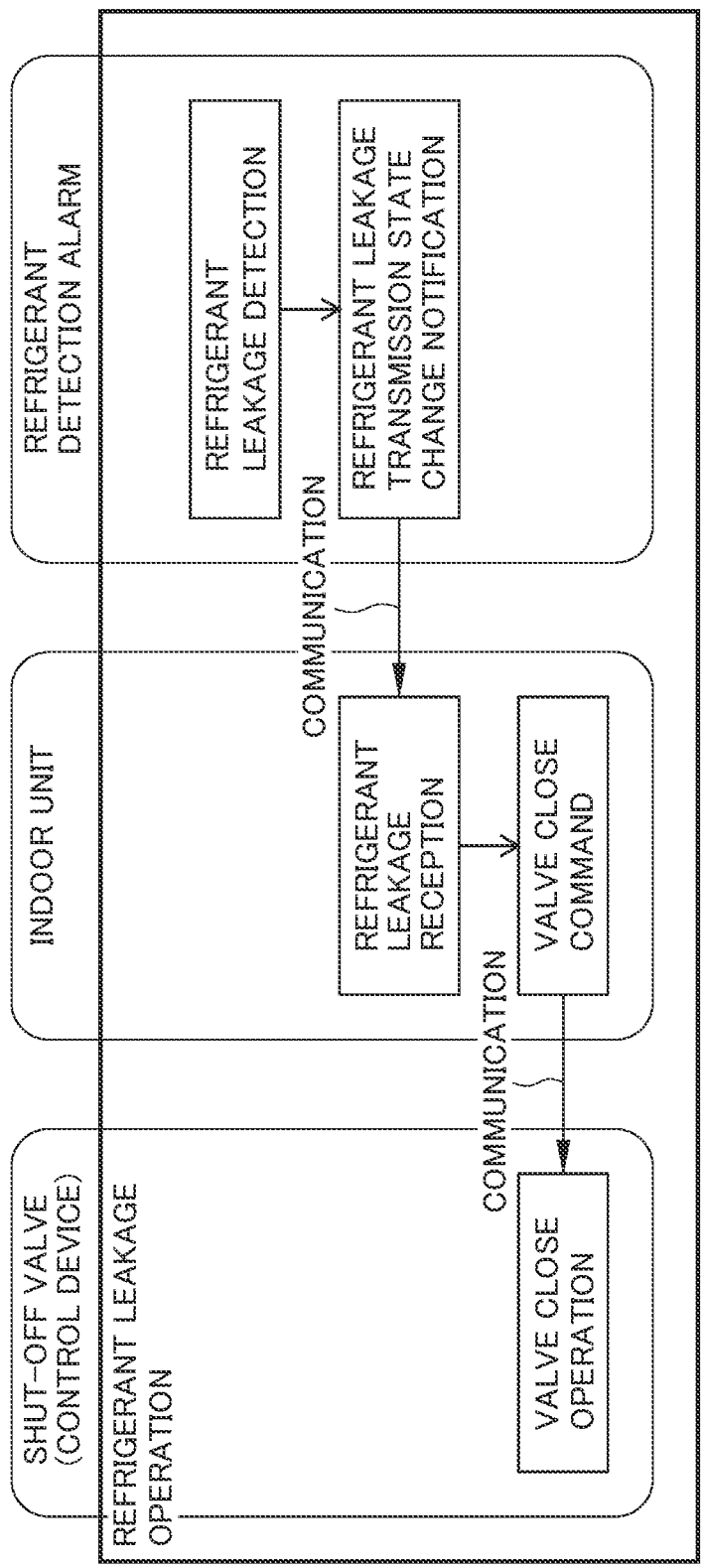
FIG. 4 is a diagram showing a refrigerant leakage operation in the same control sequence.

In a refrigerant leakage operation shown in FIG. 4, when the refrigerant detection alarm 4 detects leakage of the refrigerant, the refrigerant detection alarm 4 performs a "refrigerant leakage transmission" via the communication bus 17 in order to notify the indoor unit 1 of the detection. Upon receiving the notification, the indoor unit 1 transmits a "valve close command" to the shut-off valve device 3. When the shut-off valve device 3 receives the "valve close command", the shut-off valve device 3 closes the shut-off valves 12 and 13. Due to the operations, the indoor unit 1 is disconnected from the refrigeration cycle and the refrigerant does not leak into the air-conditioned room in excess of an amount that is present in the indoor unit 1. Since the refrigerant is mainly stored in the outdoor unit 2 in a large amount, if the refrigerant to leak indoors is limited to the refrigerant stored inside the indoor unit 1, leakage of a large amount of the refrigerant indoors can be prevented.

Operation During Power Failure (1) (During Power Failure of all Devices)

Figure 5:
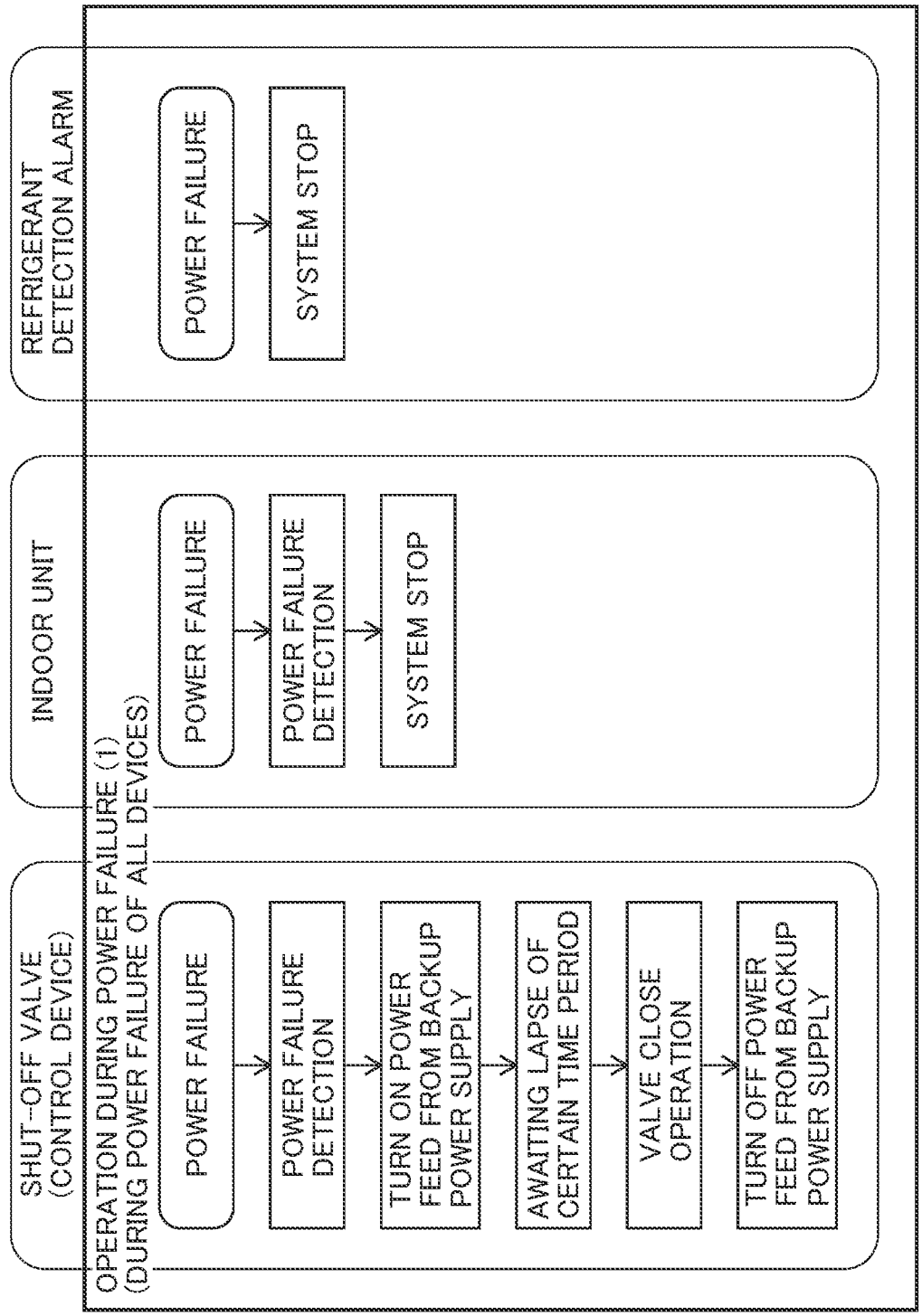
FIG. 5 is a diagram showing an operation during power failure (1) in the same control sequence.

In an operation during power failure (1) shown in FIG. 5, the refrigerant detection alarm 4 immediately advances to "system stop". The indoor unit 1 advances to "system stop" after "power failure detection". In the shut-off valve device 3, "power failure detection" is performed by the power failure detection circuit 27 and the shut-off valve control circuit 15 turns on power feed from the backup power supply 16 via the discharge circuit 28. Subsequently, after "awaiting lapse of certain time period", the shut-off valves 12 and 13 are closed.

Operation During Power Failure (2) (During Power Failure of Only Device 3)

Figure 6:
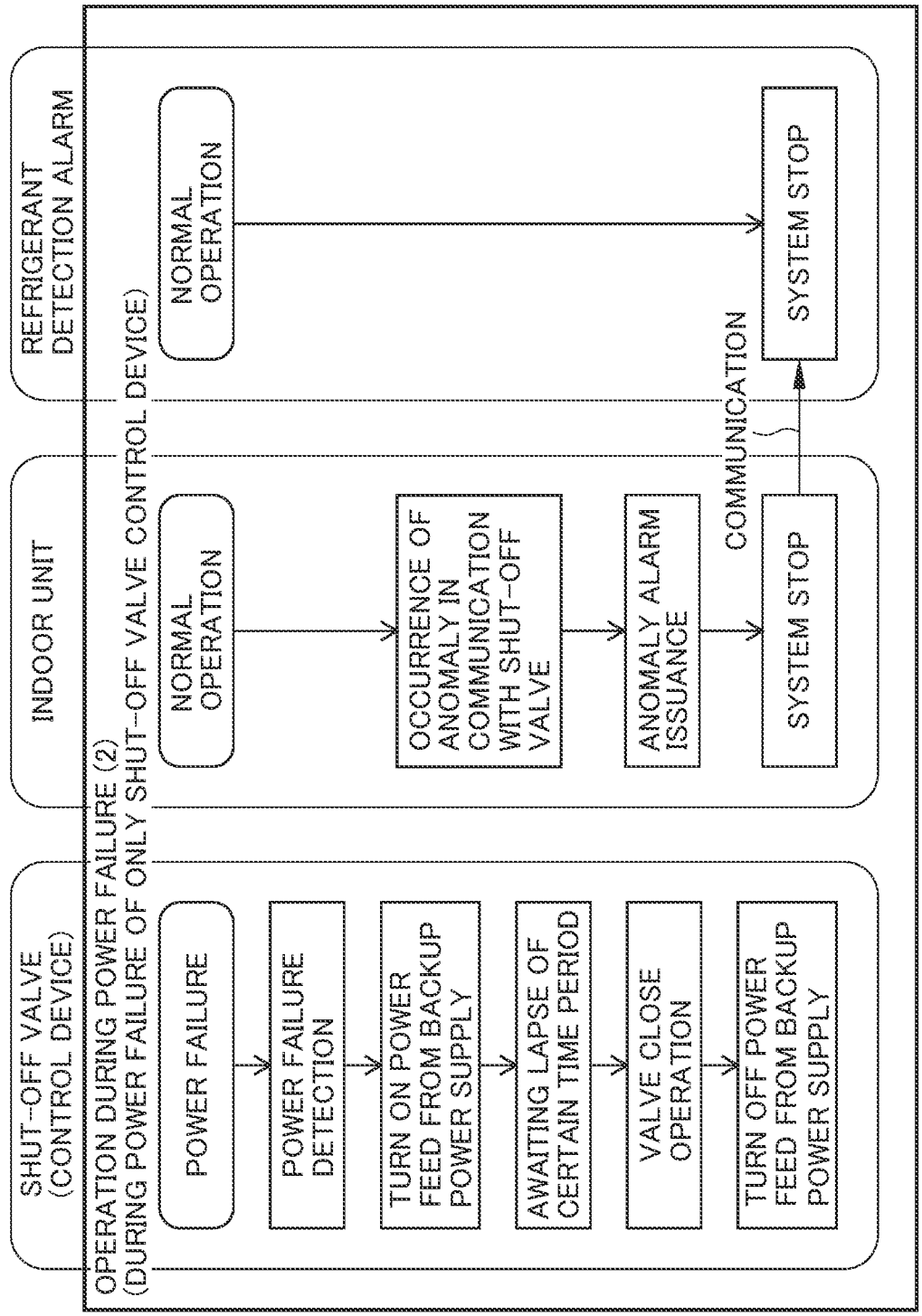
FIG. 6 is a diagram showing an operation during power failure (2) in the same control sequence.

In an operation during power failure (2) shown in FIG. 6, while the operation of the shut-off valve device 3 is the same as in FIG. 5, the shut-off valve control circuit 15 stops communicating with the indoor unit 1 during a period when the shut-off valve control circuit 15 operates due to power being fed from the backup power supply 16. While the indoor unit 1 and the refrigerant detection alarm 4 continue "normal operation", when the indoor unit 1 detects that communication with the shut-off valve device 3 has been disrupted, the indoor unit 1 makes a determination of "communication anomaly occurrence". In addition, after performing "anomaly alarm issuance", the indoor unit 1 makes a transition to "system stop". Accordingly, the indoor unit 1 transmits the fact that the status is "system stop" to the refrigerant detection alarm 4 and the refrigerant detection alarm 4 also makes a transition to "system stop".

Operation During Power Failure (3) (During Power Failure of Only Indoor Unit 1)

Figure 7:
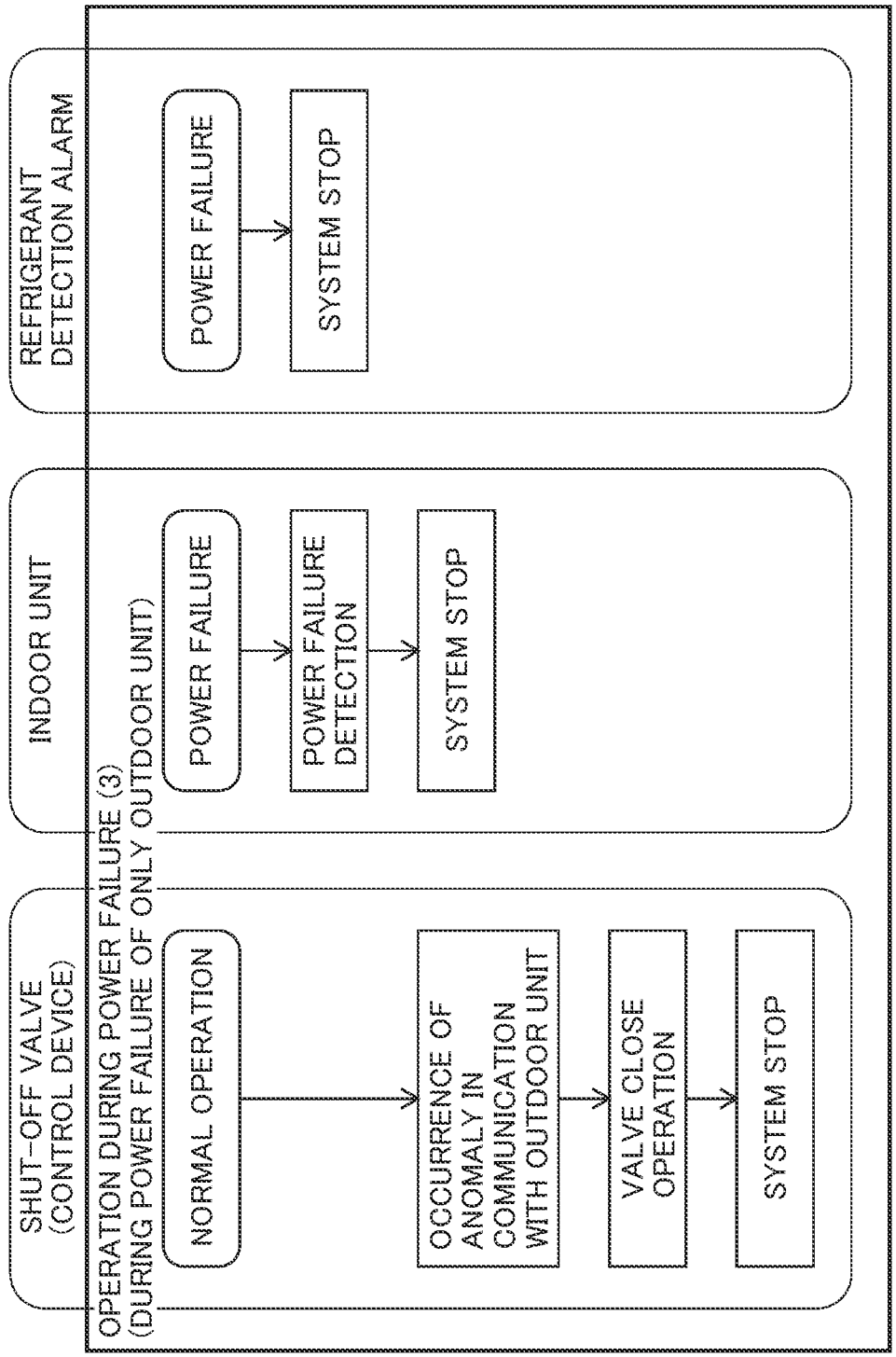
FIG. 7 is a diagram showing an operation during power failure (3) in the same control sequence.

In an operation during power failure (3) shown in FIG. 7, operations of the indoor unit 1 and the refrigerant detection alarm 4 are the same as in FIG. 5. While the shut-off valve device 3 continues "normal operation", when the shut-off valve device 3 detects that communication with the indoor unit 1 has been disrupted, the shut-off valve device 3 makes a determination of "communication anomaly occurrence". Accordingly, the shut-off valve device 3 closes the shut-off valves 12 and 13 and makes a transition to "system stop".

Figure 8:
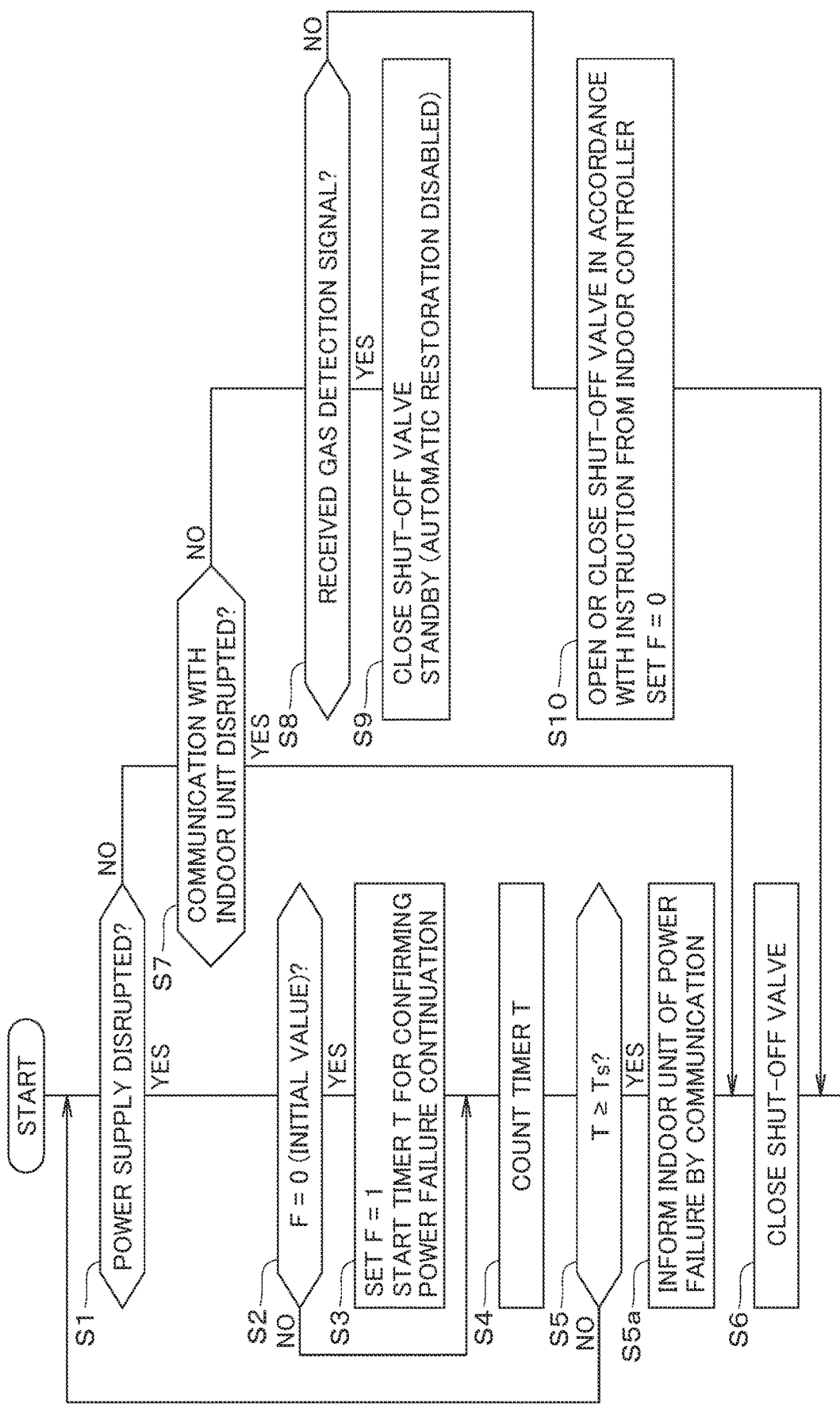
FIG. 8 is a flow chart showing processing contents in a control circuit of the shut-off valve control device.

FIG. 8 is a flow chart showing processing contents in the shut-off valve control circuit 15. The shut-off valve control circuit 15 determines power supply shutoff or, in other words, whether or not a power failure has been detected (S1). When a power failure is not detected (NO), the shut-off valve control circuit 15 sequentially determines whether or not communication with the indoor unit 1 has been disrupted (S7) and whether or not a gas detection signal has been received from the refrigerant detection alarm 4 (S8). When the shut-off valve control circuit 15 makes a determination of "NO" in both steps S7 and S8, the shut-off valve control circuit 15 opens or closes the shut-off valves 12 and 13 in accordance with an instruction from the indoor control circuit 5 of the indoor unit 1 and sets a flag F to "0" being an initial value (S10).

When the shut-off valve control circuit 15 determines power supply shutoff in step S1 (YES), the shut-off valve control circuit 15 determines whether or not "F=0" is satisfied (S2). When "F=0" is satisfied (YES), after setting "F=1", the shut-off valve control circuit 15 starts a count by a timer T used to confirm that a power failure state is ongoing (S3), and performs the count of the timer T (S4).

Next, the shut-off valve control circuit 15 determines whether or not a count value T of the timer T is equal to or larger than a threshold Ts (S5). The threshold Ts corresponds to the "certain time period" described earlier and is set to, for example, around several minutes. When the count value T is smaller than the threshold Ts (NO), the shut-off valve control circuit 15 returns to step S1. On the other hand, when the count value T is equal to or larger than the threshold Ts (YES), the shut-off valve control circuit 15 informs the indoor unit 1 of a power failure (S5a) and then closes the shut-off valves 12 and 13 (S6). The shut-off valve control circuit 15 also makes a transition to step S6 when making a determination of (YES) in step S7. When the shut-off valve control circuit 15 makes a determination of (YES) in step S8, the shut-off valve control circuit 15 similarly closes the shut-off valves 12 and 13 and makes a transition to a standby state (S9).

Figure 9:
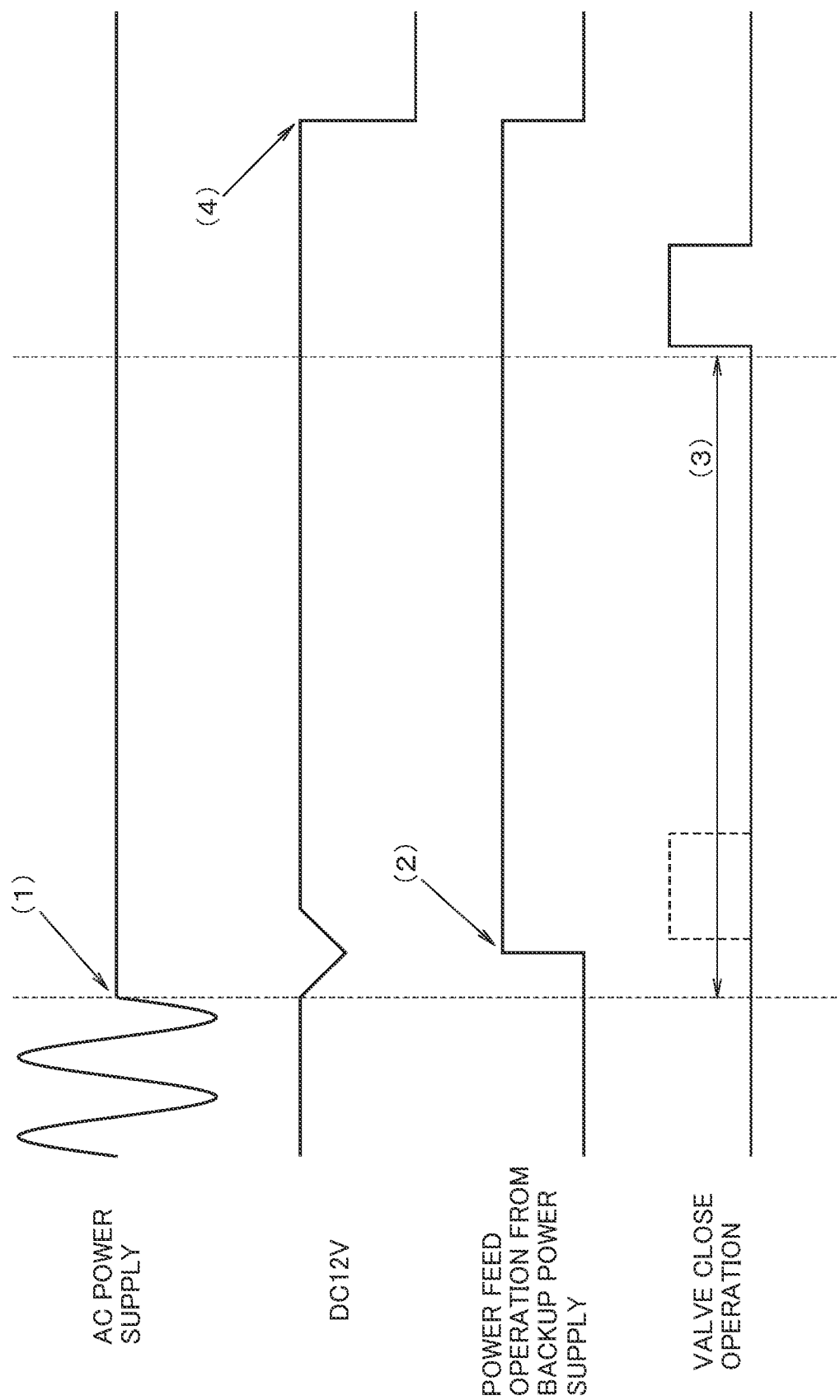
FIG. 9 is a timing chart corresponding to a case where a power failure occurring in an AC power supply continues for a predetermined time period.
Figure 10:
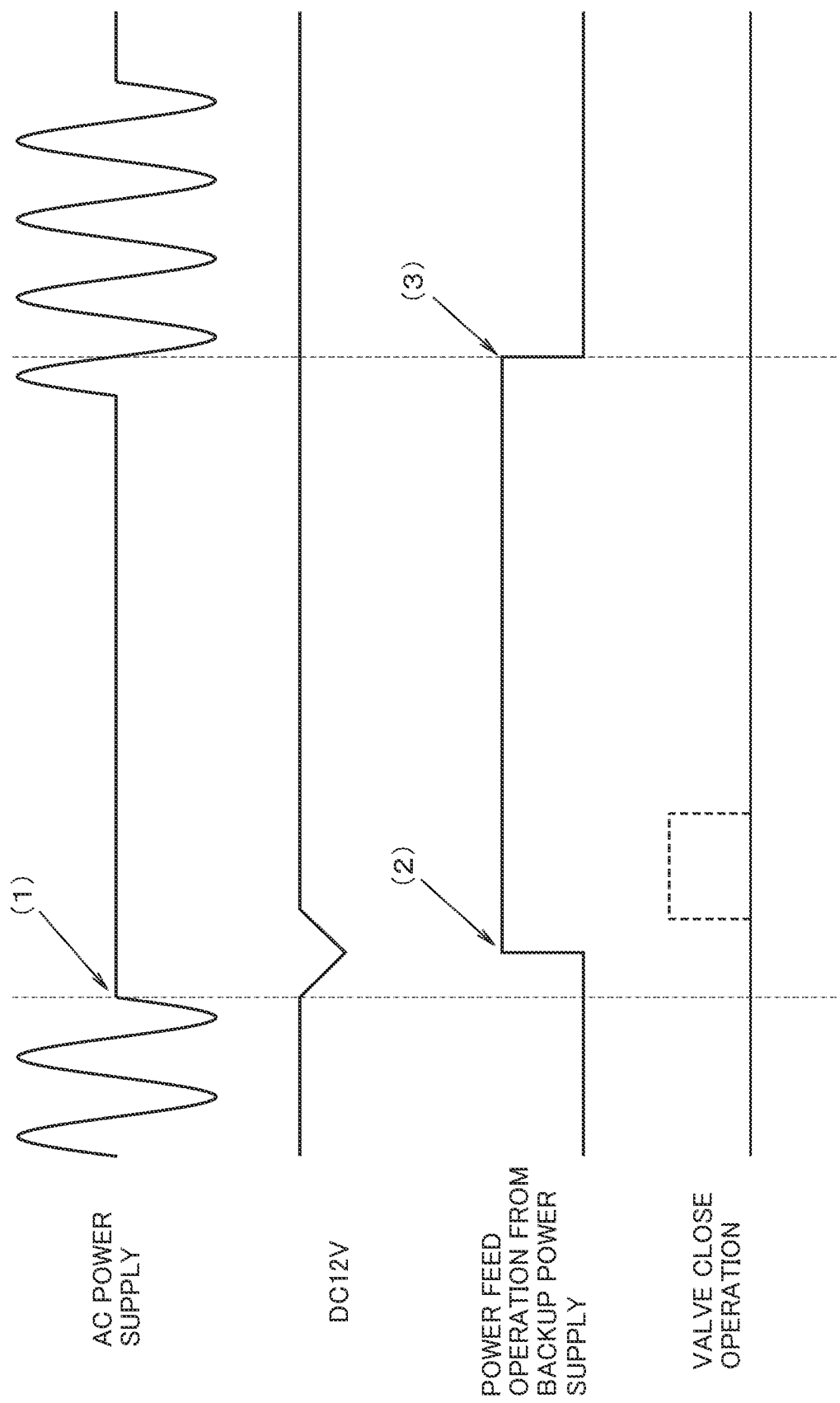
FIG. 10 is a timing chart corresponding to a case where an instantaneous power failure occurs in the AC power supply.

FIG. 9 is a timing chart corresponding to a case where a power failure occurring in the AC power supply 18 continues for a predetermined time period, and FIG. 10 is a timing chart corresponding to a case where an occurred power failure is resolved and a recovery is made within a certain time period or, in other words, an occurrence of a so-called instantaneous power failure. As shown in FIG. 9, (1) when the shut-off valve control circuit 15 detects that a power failure has occurred in the AC power supply 18, (2) the shut-off valve control circuit 15 causes power feed from the backup power supply 16 via the discharge circuit 28 to be started. Accordingly, voltage of the 12 V power supply is promptly restored.

At this point, since a power failure is detected, conventionally, the shut-off valve control circuit 15 immediately closes the shut-off valves 12 and 13 or, in other words, closes the shut-off valves 12 and 13 at a timing indicated by a dashed line. However, in the present embodiment, (3) the shut-off valve control circuit 15 closes the shut-off valves 12 and 13 once (T≥Ts) is satisfied after a certain time period elapses while advancing through the loop of steps S1 to S8 in FIG. 8. Due to this operation, even in the unlikely event that the refrigerant leaks during a power failure, leakage to the air-conditioned room in excess of the amount of refrigerant stored in the indoor unit 1 can be prevented.

On the other hand, during an occurrence of an instant power failure during an extremely short time period or a so-called instantaneous power failure shown in FIG. 10, since (3) power supply from the AC power supply 18 is restored before the certain time period elapses, the shut-off valve control circuit 15 does not execute an operation of closing the shut-off valves 12 and 13. For example, compared to a current consumption value being around 10 mA when only the shut-off valve control circuit 15 is operating, a current consumption value when opening or closing the shut-off valves 12 and 13 is around 500 mA. Therefore, even when only the shut-off valve control circuit 15 is operated for a certain time period, since electric power consumption is kept low as long as an operation to close the shut-off valves 12 and 13 is not executed, draining of the backup power supply 16 can be suppressed.

As described above, according to the present embodiment, the gas sensor 19 of the refrigerant detection alarm 4 detects leakage of a refrigerant that is used in a refrigeration cycle including the indoor unit 1 and the outdoor unit 2. The shut-off valves 12 and 13 are arranged in the pipes 10 and 11 which connect the indoor unit 1 and the outdoor unit 2 to each other, and the power failure detection circuit 27 detects a power failure occurring in the AC power supply 18.

The backup power supply 16 is configured to be capable of supplying power upon an occurrence of the power failure as an alternative to the AC power supply 18. When the power failure detection circuit 27 detects a power failure, the shut-off valve control circuit 15 causes power supply from the backup power supply 16 to be started, and when the shut-off valve control circuit 15 confirms that the power failure detection circuit 27 is continuously detecting a power failure even after a lapse of a certain time period, the shut-off valve control circuit 15 controls the shut-off valves 12 and 13 to be closed. Therefore, since the shut-off valve control circuit 15 does not perform an operation to close the shut-off valves 12 and 13 during an occurrence of the instantaneous power failure shown in FIG. 10, draining of the backup power supply 16 can be suppressed.

Second Embodiment

Figure 11:
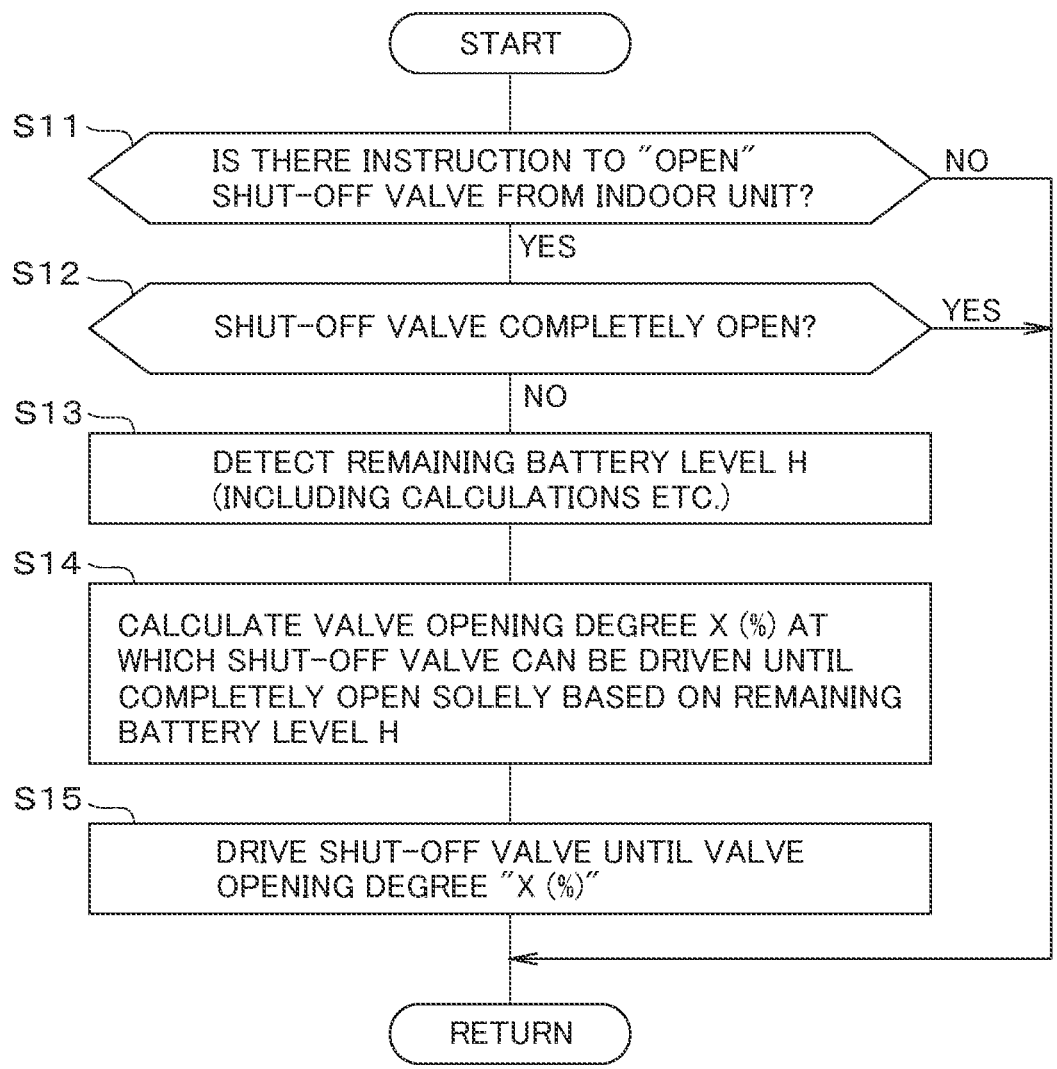
FIG. 11 is a flow chart showing processing contents when the control circuit of the shut-off valve control device performs a "valve open operation" shown in FIG. 3 according to a second embodiment.

Hereinafter, same portions as the first embodiment will be denoted by same reference signs and descriptions of such portions will be omitted, and different portions will be mainly described. Even in this embodiment, electronically controlled valves of which an opening degree can be controlled from completely closed to completely open by being driven by a motor are used as the shut-off valves 12 and 13 in a similar manner to the first embodiment. The second embodiment shown in FIG. 11 represents control contents when the shut-off valve control circuit 15 performs the "valve open operation" shown in FIG. 3. When an "open" instruction of the shut-off valves is issued by the indoor unit 1 (S11: YES), the shut-off valve control circuit 15 determines whether the shut-off valves 12 and 13 are completely open at that time point (S12). If not completely open (NO), the shut-off valve control circuit 15 detects a remaining battery level H of the backup power supply 16 (S13). Note that the remaining battery level H may be obtained by the shut-off valve control circuit 15 by calculation.

Next, the shut-off valve control circuit 15 calculates a valve opening degree X (%) at which the shut-off valves 12 and 13 can be driven until a completely closed state based on the remaining battery level H (S14). In addition, the shut-off valve control circuit 15 opens the shut-off valves 12 and 13 until the opening degree of the shut-off valves 12 and 13 equals the above mentioned X (%) (S15).

In other words, when the shut-off valves 12 and 13 are completely open in a case where there is supply of electric power from the power supply 18 but the remaining battery level H of the backup power supply 16 is low, if, immediately afterwards, a power failure or a refrigerant leakage occurs and a switch is made to power feed from the backup power supply 16, there is a risk that the shut-off valves 12 and 13 cannot be changed to a completely closed state due to a shortage of electric power of the backup power supply 16. In consideration thereof, by performing control as in the second embodiment, since an opening degree of the shut-off valves 12 and 13 is determined in accordance with the remaining battery level H, the shut-off valves 12 and 13 can be reliably changed to a completely closed state even when switching to power feed from the backup power supply 16.

The shut-off valves are not limited to electronically controlled valves which are driven by a motor and any valve that can be opened and closed using electric power may suffice.

Having described several embodiments of the present invention, it is to be understood that the embodiments are merely presented as examples and are not intended to limit the scope of the invention. These novel embodiments can be implemented as a wide variety of other embodiments, and various omissions, replacements, and alterations can be made without departing from the gist of the invention. These embodiments and modifications thereof are included in the scope and gist of the invention, and are also included in the scope of the invention as set forth in the claims and equivalents thereof.

The invention claimed is:
1. A shut-off valve control device for a refrigeration cycle comprises:
   a leakage detector configured to detect leakage of a refrigerant that is used in a refrigeration cycle including an indoor unit and an outdoor unit;

a shut-off valve which is disposed in a pipe that connects the indoor unit and the outdoor unit with each other and which can be opened and closed by supplying electric power;

a power failure detector configured to detect a power failure in an AC power supply configured to supply electric power to the shut-off valve;

a backup power supply configured to be capable of alternatively supplying power upon an occurrence of a power failure; and a shut-off valve control circuit configured to control the shut-off valve to be closed when the leakage detector detects leakage of the refrigerant, wherein the shut-off valve control circuit is configured to control the shut-off valve to be closed when the power failure detector continues to detect a power failure for a predetermined time period, wherein the shut-off valve is an electronically controlled valve configured to be driven by a motor and of which an opening degree can be controlled from completely closed to completely open, and wherein the shut-off valve control circuit is configured to, upon acquiring a charge amount of the backup power supply at power-on, change the opening degree of the electronically controlled valve in accordance with the charge amount.

2. An air conditioner, comprising:

an indoor unit installed indoors;

an outdoor unit;

a leakage detector which is installed indoors where the indoor unit is installed and which is configured to detect leakage of a refrigerant that is used in a refrigeration cycle made up of the indoor unit and the outdoor unit; and a shut-off valve device which is provided midway along a pipe that connects the indoor unit and the outdoor unit with each other and which is equipped with a shut-off valve configured to open or shut off a flow of the refrigerant between the indoor unit and the outdoor unit by electric power, wherein the shut-off valve device includes: a power failure detector configured to detect a power failure in an AC power supply configured to supply electric power to the shut-off valve;

wherein a backup power supply capable of alternatively supplying electric power upon an occurrence of a power failure;

wherein a shut-off valve control circuit configured to control the shut-off valve to be closed when the power failure detector detects leakage of the refrigerant and to control the shut-off valve to be closed when the power failure detector continues to detect a power failure for a predetermined time period, wherein the shut-off valve is an electronically controlled valve configured to be driven by a motor and of which an opening degree can be controlled from completely closed to completely open, and wherein the shut-off valve control circuit is configured to, upon acquiring a charge amount of the backup power supply at power-on, change the opening degree of the electronically controlled valve in accordance with the charge amount.

\* \* \* \* \*